US010274032B2

(12) United States Patent
Grabiec et al.

(10) Patent No.: US 10,274,032 B2
(45) Date of Patent: Apr. 30, 2019

(54) PROCESS FOR PRODUCING A BRAKE DISK AND BRAKE DISK

(71) Applicant: FORD GLOBAL TECHNOLOGIES, LLC, Dearborn, MI (US)

(72) Inventors: Tomasz Pawel Grabiec, Bergisch Gladbach (DE); Ivan Jan Mathieu Ernest Bruggen, Riemst (BE); Clemens Maria Verpoort, Monheim am Rhein (DE); Thomas Schläfer, Limburg (DE)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 15/408,970

(22) Filed: Jan. 18, 2017

(65) Prior Publication Data

US 2017/0122393 A1    May 4, 2017

Related U.S. Application Data

(62) Division of application No. 14/669,521, filed on Mar. 26, 2015, now Pat. No. 9,574,260.

(30) Foreign Application Priority Data

Mar. 26, 2014 (DE) .................... 10 2014 205 666

(51) Int. Cl.
*F16D 65/12*       (2006.01)
*C23C 2/06*       (2006.01)
(Continued)

(52) U.S. Cl.
CPC .............. *F16D 65/127* (2013.01); *C23C 2/06* (2013.01); *C23C 2/12* (2013.01); *C23C 4/10* (2013.01); *C23C 4/131* (2016.01); *C23C 28/321* (2013.01); *C23C 28/341* (2013.01); *F16D 65/128* (2013.01); *F16D 65/847* (2013.01); *F16D 2065/788* (2013.01);
(Continued)

(58) Field of Classification Search
CPC ............................ F16D 65/127; F16D 65/128
USPC .................................................... 188/218 XL
See application file for complete search history.

(56) References Cited

U.S. PATENT DOCUMENTS 6,598,716 B1 * 7/2003 Ihm ..................... B23P 15/00
                                                                                                                      188/218 XL
6,821,447 B1 * 11/2004 Storstein ............... F16D 69/027
                                                                                                                      188/251 M
(Continued)

FOREIGN PATENT DOCUMENTS

CN      103185087 A     7/2013
DE         1625680 B1     4/1972
(Continued)

OTHER PUBLICATIONS

EPO translation, DE 10 2004 016092 A1, Oct. 2005. (Year: 2005).*
(Continued)

*Primary Examiner* — Thomas J Williams
(74) *Attorney, Agent, or Firm* — Ray Coppiellie; King & Schickli, PLLC

(57) ABSTRACT

A brake disk includes a circular base body having a circumferential outer brake rim, a friction layer in certain regions on the base body and an adhesion-promoter or functional layer arranged over an entirety of the base body.

2 Claims, 3 Drawing Sheets

Figure 1:
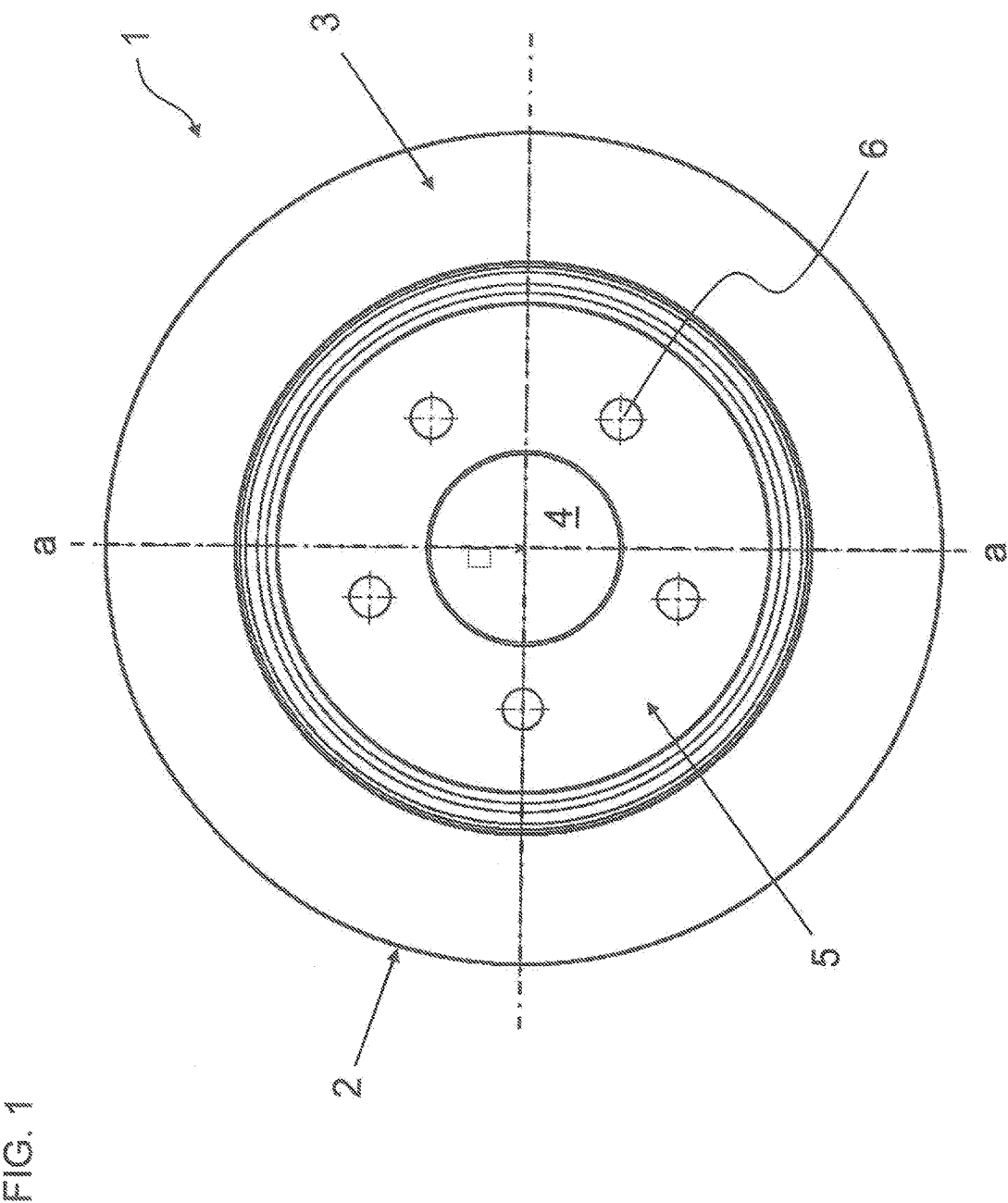

(51) Int. Cl.
  *C23C 2/12* (2006.01)
  *C23C 4/10* (2016.01)
  *C23C 28/00* (2006.01)
  *C23C 4/131* (2016.01)
  *F16D 65/847* (2006.01)
  *F16D 65/78* (2006.01)

(52) U.S. Cl.
  CPC .. *F16D 2200/0013* (2013.01); *F16D 2250/00* (2013.01); *F16D 2250/0038* (2013.01); *F16D 2250/0046* (2013.01); *Y10T 29/49885* (2015.01); *Y10T 29/49982* (2015.01)

(56) References Cited

U.S. PATENT DOCUMENTS

2004/0031652 A1 * 2/2004 Khambekar .......... F16D 65/127
  188/218 XL
2009/0026025 A1 * 1/2009 Hampton .............. F16D 65/127
  188/218 XL
2013/0161136 A1 * 6/2013 Huschenhoefer ........ B05D 7/14
  188/218 XL
2013/0161137 A1 * 6/2013 Huschenhoefer ....... F16D 65/12
  188/218 XL

FOREIGN PATENT DOCUMENTS

| | | | |
|---|---|---|---|
| DE | 102004016092 A1 * | 10/2005 | ............. F16D 65/12 |
| DE | 102010049797 A1 | 5/2012 | |
| EP | 1987267 B1 | 10/2012 | |
| FR | 2693246 A1 * | 1/1994 | ........... F16D 65/127 |

OTHER PUBLICATIONS

English Machine Translation of DE102010049797A1.
English Machine Translation of DE1625680B1.
English Machine Translation of EP1987267B1.
English Machine Translation of CN103185087A.

* cited by examiner

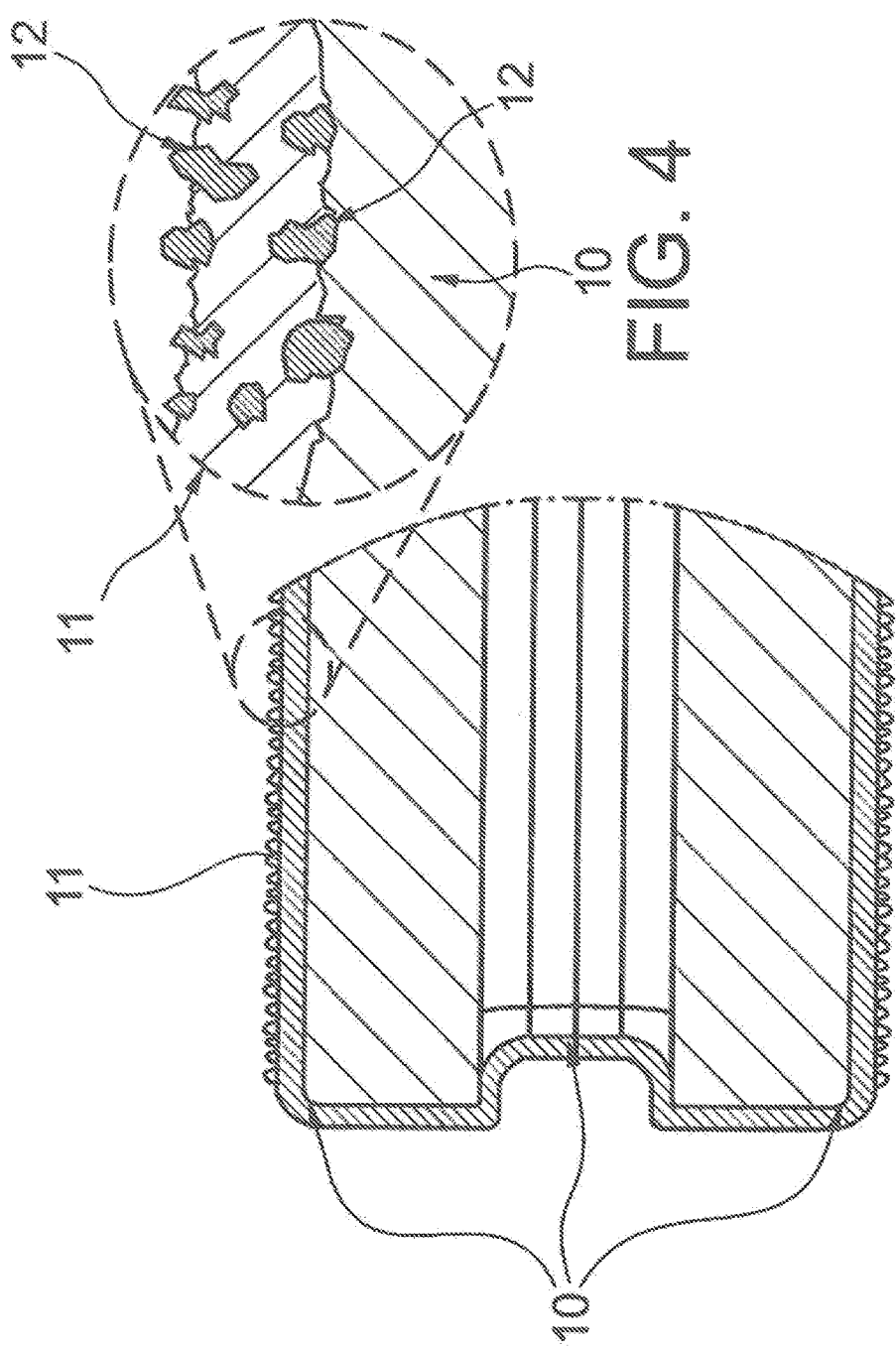

PROCESS FOR PRODUCING A BRAKE DISK AND BRAKE DISK

This application is a divisional patent application claiming priority to German patent application serial no. DE102014205666.7 filed on 26 Mar. 2014 and U.S. patent application Ser. No. 14/669,521, filed on 26 Mar. 2015, now U.S. Pat. No. 9,574,260, the full disclosure of each of which is incorporated herein in its entirety by reference.

TECHNICAL FIELD

The present invention relates to a process for producing a brake disk for a vehicle and also to a brake disk for a vehicle.

BACKGROUND

DE AS 1 625 680 deals with a friction body for wet clutches and brakes, having a carrier and at least one sintered, porous and metallic friction lining fitted to the carrier. It was proposed that the friction lining consists of metal fibers, with the intention being for the degree of porosity to be at least 50%.

It is known from DE 10 2010 049 797 A1 that a brake disk can be produced integrally with a wheel hub, and therefore it should be possible for the axial run-out of the brake disk to be reduced. In addition, the friction surfaces of the brake disk could be provided with a friction coating, which can consist of a hard metal or of a ceramic.

EP 1 987 267 B1 deals with a brake disk based on the use of materials, one of which is to perform a structural function and the other is to perform a brake function. The brake disk comprises a support or structural disk, the sides of which are equipped with a first and a second friction disk. The friction disks are produced from a material suitable for performing the brake function. The structural disk is produced from composite material. The composite material of the structural disk can consist of a resin, optionally from among epoxy, phenolic, cyanoester, cyanoepoxy and ceramic resins and enamel or a combination thereof. The friction disks can be produced from a material selected from among steel, cast iron, aluminum alloy, aluminum oxide (ceramic), silicon carbide, silicon nitride, titanium carbide and carbon ceramic.

In vehicles, in particular in motor vehicles, disk brakes are by far the most common type of brake systems. Disk brakes are composed substantially of a brake disk and a brake caliper which surrounds the brake disk on the edge. Here, the brake disk is connected to the wheel of the vehicle to be braked by way of a wheel hub mounted rotatably in the steering knuckle. By contrast, the brake caliper is fixed to the steering knuckle. The actual deceleration is achieved by brake pads which can be placed against the brake disk and which are arranged on both sides of the brake disk between it and the brake caliper.

Depending on the application, brake disks can consist both of iron, e.g. of gray cast iron (GCI), but also of carbon ceramic or aluminum.

Brake disks are typically cast from unalloyed gray cast iron (GCI) material. Although disks of this type can be cast and machined cost-effectively, they do not afford adequate corrosion protection against spray water from the road surface or rain water. In winter in particular, an increased corrosive attack by road salt can be observed. If vehicles are then parked for a relatively long period of time, the severe corrosion on the gray cast iron surface in the region of the friction ring can have the effect that the brake lining rusts solid, so to speak, on the brake disk. This can be attributed to the fact that the lining in a brake disk permanently bears tightly against the disk surface and rust can therefore form in this narrow gap. When the vehicle is then moved again, lining material which has rusted up can be torn out of the lining and transferred onto the disk surface. This leads to juddering of the brakes in association with a high generation of noise. In certain circumstances, it may be necessary to change the disks or to remove the adhering rust by turning. Moreover, rusty brake disks appear to be substandard if the rusted disks can be seen through the aluminum rims of premium appearance.

Furthermore, it is known that the wear resistance of the GCI brake disks is not sufficiently high. The brake linings typically used are optimized for a particular coefficient of friction, and in this respect a certain loading of the friction ring with abrasive wear is accepted. This abrasive loading has the effect, inter alia, that brake disks with red rust formation after a rainy day are metallically blank again through the actuation of the brakes when the car is next driven.

The abrasion between the brake lining and the brake disk forms particle emissions, i.e. fine dust. In addition to the problem in relation to fine dust, the visual effect of rusted brake disks in combination with expensive, premium aluminum rims also plays an additional role. It is known that approximately 70% of the fine dust particles originate from the GCI disk material. These wear particles are at a very high temperature of approximately 700° C., at which they strike against the aluminum rim. In the process, they can easily burn into the clearcoat on the aluminum surface and it is very difficult to remove the gray-black coating even in the car washing plant and with intensive maintenance. Moreover, squeaking noises or the juddering of brakes in the case of linings which have rusted up after a relatively long standstill are additionally regarded as annoying.

Therefore, intensive development work is carried out worldwide in order to improve both the corrosion resistance and the wear resistance of the brake disks. In this respect, disks are produced from a high-grade steel casting material, for example. Although the problem relating to corrosion can be eliminated in this case, the wear resistance is improved only slightly. In addition to the high costs resulting from the use of strategically important elements such as chromium and nickel, the wear resistance is improved only slightly. In addition, the thermal conductivity is reduced considerably, as a result of which the wheel bearings may be subjected to greater thermal loading.

Furthermore, numerous galvanic coating processes have been proposed for solving the problem. The production of these layers is very complex: For this purpose, it is necessary for the entire component to be coated, for example with chromium or nickel or Ni plus hard material particles. It is often the case that layers of this nature also have to be anchored to the substrate material by a diffusion annealing treatment, in order to cope with the loading of the brakes.

Another possibility is represented by thermal spraying processes: For this purpose, the GCI disks are roughened by profile turning and subsequent corundum blasting and then provided, for example, with a 17% Cr steel sprayed layer having a thickness of 500 μm. Powder and wire spraying processes are used for this purpose. After coating, the rough sprayed layers have to be reworked by turning or grinding in order to comply with the required dimensions of the brake disks. In this sprayed coating, however, only the region of the friction surface is coated, and therefore the hub region has to be protected against the onset of rust, as is common at present, by varnishing. For ventilated brake disks, the spraying process can of course produce no corrosion protection for the region between the cover disks, and therefore the webs still tend to become rusty and rusty water will then run over the friction surface with the expensive sprayed layer. Furthermore, it is found in salt spray tests that thermally sprayed layers are infiltrated on account of the microporous structure, as a result of which undercorrosion can arise. This corrosion can be prevented only by expensive sealing processes. Merely the outlay for coating the GCI disks with, for example, a reground 17% Cr steel sprayed layer having a thickness of 500 μm greater than the entire production to date for the same disk by casting plus mechanical reworking.

In the case of GCI disks or disks with a ground thermally sprayed layer, the brake lining has an abrasive effect on the surface and material is removed by abrasion upon every braking operation. Although the material removal is considerably less in the case of the hard sprayed layer, the abrasion mechanism is maintained.

It is also possible to provide what are termed temporary, cost-effective protective layers, so that the vehicles are at least transferred from the manufacturer to the end consumer without the brand-new vehicle already having rusty brake disks. These are usually colored sprayed layers containing zinc pigments. On the other hand, brake systems are known in which zinc is rubbed onto the GCI surface during the braking operation and cathodic corrosion protection arises as a result. On the other hand, this zinc film has a negative effect on the friction function of the brake lining, and the coefficients of friction fall. In this respect, the zinc protective layer is expediently a long way away from initial operation.

A nitriding diffusion coating on the basis of Fe nitride would also be possible. This coating leads to temporary protection against wear and corrosion, but the service life of this coating in fact appears to be limited to less than 40 000 km and also to be suitable only for NAO linings on the USA market. This is because at the speed limits which are much higher, and in some cases not present at all, in Germany, for example, higher brake temperatures are to be expected than, for example, in the USA, and therefore the NAO linings appear suitable there. Moreover, the process is very time-consuming and very expensive owing to the large furnace chamber required.

Numerous thermal spraying processes (these have already been mentioned above) and galvanic coating processes are similarly used. The production of these layers is very complex. In salt spray tests, however, both galvanic coatings of this type and thermally sprayed coatings perform rather poorly. Thus, the infiltration of thermally sprayed layers cannot be reliably avoided even with additional sealing processes.

In the light of the prior art indicated, the simple and sustainable production of brake disks as mass-produced items still affords room for improvement.

SUMMARY

Against this background, the invention is based on the object of presenting a process for producing a brake disk for a vehicle which makes cost-effective and nevertheless sustainable mass production possible. Furthermore, the intention is to specify a brake disk for a vehicle which, in addition to cost-effective production, has in particular an improved resistance to corrosive attacks and an improved service life.

The product-related part of said object is achieved by means of a brake disk. Further particularly advantageous refinements of the invention are disclosed in the respective dependent claims.

It is pointed out that the features and measures specified individually in the following description may be combined with one another in any desired technically meaningful way and disclose further refinements of the invention. The description, in particular in conjunction with the figures, characterizes and specifies the invention further.

According to the invention, what is presented herein below is a process for producing a brake disk for a vehicle, in which a friction layer is arranged at least in certain regions on a base body. According to the invention, the process comprises at least the following steps:

pre-machining the base body present in the blank at least in certain regions; heating the base body; dipping the heated base body in a melt comprising base metal alloys, such that an adhesion-promoting coating is formed between the base body and the friction layer still to be applied; applying the friction layer to the base body at least in certain regions by means of thermal spraying processes.

For the purposes of the invention, the pre-machining of the base body present in the blank at least in certain regions comprises the brake disk being finished virtually in such a way that post-machining can optionally also be effected after the individual coating operations. It is expedient that the entire base body, i.e. the complete brake disk, is dipped in the base metal melt. For the purposes of the invention, a melt comprising base metals is an aluminum and/or zinc alloy melt. In association with the preceding heating of the base body preferably to a temperature of 500° C. to 700° C. under a protective gas atmosphere, the base metal, that is for example the aluminum and/or the zinc, diffuses into the substrate material, i.e. into the gray cast iron of the base body. This forms a metallurgical bond with a very high adhesive strength, where this adhesion-promoter coating is not microporous like directly applied thermally sprayed layers and therefore also cannot be infiltrated. In addition, the aluminum and/or zinc alloy melt according to the invention has the effect that cathodic corrosion protection is formed, it being possible even for imperfections which are possibly present or for areas of damage which arise during operation to be closed on account of the remote action, such that as it were self-healing occurs.

The brake disk, i.e. the base body thereof, is preferably produced by means of sand casting. In this case, the base body, i.e. the blank, has a circumferential outer brake rim provided for contact with a brake pad of a brake caliper, the brake pads or brake linings acting of course on both sides of the brake rim, i.e. of the friction surfaces. An opening is provided in the center of the base body, arranged in a protrusion of the base body. Five passage holes through the protrusion are preferably arranged around the opening at uniform intervals. Said passage holes serve for receiving wheel bolts, by way of which the brake disk can be connected together with a wheel to a wheel hub. The protrusion, which can also be referred to as the disk cap structure, can be produced integrally, i.e. can be cast, with the brake rim, or can be connected in a suitable manner to the brake rim as a separate element. The base body can be produced as an unventilated or ventilated brake disk, which is known per se. In the case of the ventilated brake disk, the friction surfaces are arranged on cover disks, with the opposing cover disks being spaced apart by way of ribs. Each cover disk of course also has only one friction surface, but this is known per se.

An air gap is thus formed between the cover disks, but this is also known per se and therefore no further details are provided in relation thereto.

Since the entire brake disk is dipped in the hot-dip bath, it is also covered entirely, i.e. completely, with the adhesion-promoter layer. This is expedient here since the regions lying outside the actual friction surfaces are thus also provided with the adhesion-promoter layer, i.e. with corrosion protection, in one step means of the hot-dip coating, and therefore further special measures for protecting these regions can be dispensed with. The invention is suitable in particular for ventilated brake disks since both the entire inner surface of the cover disks and also the ribs are covered completely in addition to the other regions by means of the dip bath.

Once the adhesion-promoter layer has been applied by means of the hot-dip bath, it can be provided in a further step that the base body, i.e. the brake disk, in particular the friction surfaces, is/are turned to dimension.

The invention is based on the understanding that the base metal alloys selected, in particular the aluminum alloy, forms a "soft" coating. This circumstance is actually negative with respect to the brake disks, but, in the invention, provides an ideal adhesion-promoter coating for the subsequent thermal coating.

In this process, hard material powders are injected by means of the preferred high-velocity flame spraying (HP-HVOF) into the soft surface of the adhesion-promoter coating at least in the region of the friction ring, i.e. the friction surfaces, so as to give rise to an intimate bond between the hard material particles and the adhesion-promoter layer.

It is sufficient here for the purposes of the invention if a very thin friction layer measuring 30 μm to 50 μm is applied. In this respect, it is within the scope of the invention that the friction layer per se is not to serve as a wear layer, but rather serves according to the invention for removing, i.e. for tearing, material particles out of the lining material of the brake linings, such that a transfer film is formed. During the braking operation, lining material is thus torn out of the brake lining and transferred to the surface, i.e. for example to the aluminum surface or zinc surface, in the region of the friction ring. This transfer film embeds the microrough surface of the exemplary aluminum surface of the friction ring. The friction does not materialize here through abrasion, but instead by a type of adhesion. The transfer film remains permanently on the friction ring and protects the aluminum surface against wear, and therefore the brake disk virtually does not have to be renovated and replaced. The brake lining, by contrast, is in the form of a wear part and constantly delivers new material for stabilizing the transfer film. If the adhesion-promoter layer comprises zinc or zinc constituents, it is evident that the transfer film also embeds the zinc surface, such that the latter, too, is protected against wear. However, this also means that the coefficients of friction of the zinc as mentioned above have no influence on account of the transfer film.

In this respect, no complex blasting operations and also no complex regrinding operations are required in the process according to the invention. Instead, the thermally applied sprayed layer, i.e. the friction layer, is commissioned in the rough state.

In a possible embodiment, a tungsten carbide (WC) spraying powder is thermally applied to the adhesion-promoter layer as spraying powder. In a preferred refinement, a tungsten carbide spraying powder, i.e. for example a WC—Co—Cr spraying powder, is applied thermally. An FeNiCr powder as matrix with incorporated WC or TiC particles is also conceivable for the purposes of the invention, however. The particles can have a diameter which is greater than the friction layer of 30 μm to 50 μm in thickness. The sharp-edged particles thus protrude out of the friction layer, and thereby produce the transfer film. In this respect, sharp-edged hard material particles are as it were injected into the adhesion-promoter layer, such that the (micro)rough hard material layer required for forming the transfer film, i.e. the transfer layer, is produced. Here, a preceding blasting operation as has been required to date in conventional thermal spraying processes is not needed in the invention. Except for the turning of the adhesion-promoter layer applied by means of the hot-dip bath to the final dimensions of the brake disk, at least in the region of the friction surfaces, further post-machining of the hard material layer applied by means of the HVOF process is not required. The finished adhesion-promoter layer in the region of the friction ring can have a thickness of 200 μm, for example.

The adhesion-promoter layer can also be referred to as a functional layer, and has as it were a dual function. On the one hand, the layer in question serves as corrosion protection also for the regions of the brake disk which lie outside the friction surfaces (also the prevention of red rust). On the other hand, the layer simultaneously serves as an adhesion promoter for the application of the (micro)rough hard material layer by means of the preferred HP-HVOF process.

The base body, i.e. the brake disk, is produced from GCI. It is of course also possible for an aluminum brake disk to be coated by the HP-HVOF process.

According to the invention, a brake disk is produced by the above-described process steps. In this respect, the brake disk according to the invention has an adhesion-promoter layer which is applied to the substrate material thereof and on which there is arranged a hard material layer at least in certain regions.

Here, the adhesion-promoter layer is arranged over the complete brake disk. This means that not only the friction surfaces but also all regions outside the latter are provided, i.e. are covered, with the adhesion-promoter layer. In a preferred embodiment, the adhesion-promoter layer is applied by dipping the brake disk in a base metal melt. After finishing, i.e. for example after turning to final dimensions at least in the region of the friction rings, the adhesion-promoter layer has a thickness of 200 μm. The friction layer is arranged on the adhesion-promoter layer, but is preferably arranged merely in the region of the friction surfaces of the brake disks. Brake pads act on the friction surfaces by way of their linings. On account of the sharp-edged hard materials of the friction layer, brake lining material is torn out of the brake lining, such that a transfer film is formed. The brake lining thus becomes worn, with wearing of the brake disk being avoided.

BRIEF DESCRIPTION OF THE DRAWING FIGURES

Figure 2:
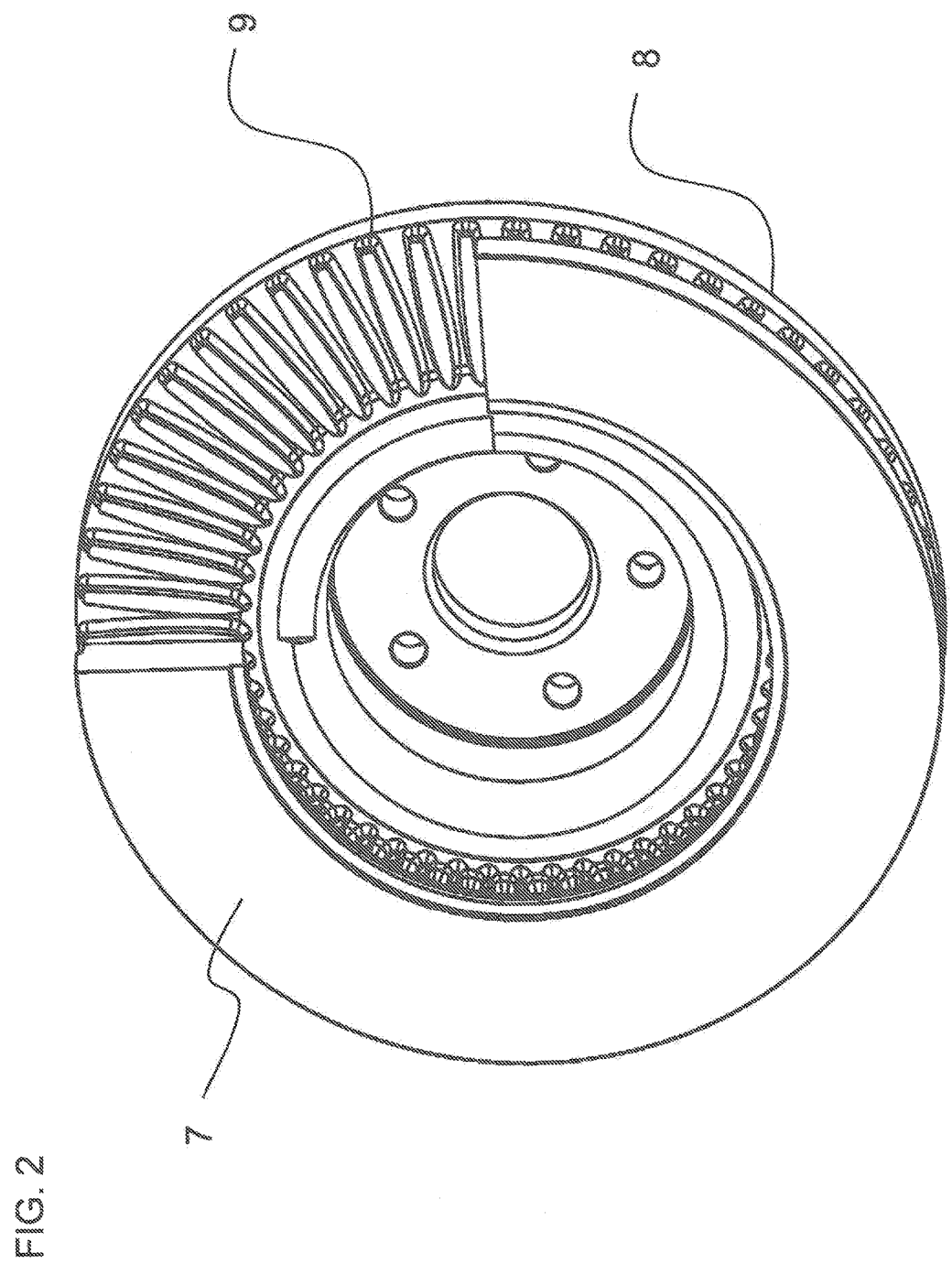

Further advantageous details and effects of the invention will be explained in more detail below on the basis of various exemplary embodiments illustrated in the figures. In the figures:

FIG. 1 is a schematic illustration of a brake disk according to the invention in a plan view, FIG. 2 shows a ventilated brake disk in a perspective view, FIG. 3 shows the brake disk shown in FIG. 2 in a partial sectional view, and FIG. 4 shows an enlarged view of the section which can be seen in FIG. 3.

In the different figures, identical parts are always provided with the same reference signs, and so said parts are generally also described only once.

DETAILED DESCRIPTION

FIG. 1 shows a schematic illustration of a brake disk 1 according to the invention. Said brake disk has a circular base body 2 made, for example, of cast iron, i.e. for example of gray cast iron (GCI). The base body 2 typically has a circumferential outer brake rim 3, which is provided for contact with a brake lining (not shown in greater detail). An opening 4 is provided in the center of the base body 2, arranged in a protrusion 5 of the base body 2. The protrusion 5 may also be referred to as a disk cap structure 5. In the present case, five passage holes 6 through the protrusion 5 are arranged around the opening 4 at uniform intervals. Said passage holes 6 serve for receiving wheel bolts (not shown in greater detail here), by way of which the brake disk 1 can be connected together with a wheel (not shown) to a wheel hub (likewise not shown).

FIG. 2 shows a brake disk 1 having cover disks 7 and 8 between which there are arranged ribs 9, such that a ventilated brake disk 1 is formed. The cover disks 7 and 8 each have the brake rim 3 on the outer side.

FIG. 3 shows a partial section of the internally ventilated brake disk 1 shown in FIG. 2.

A functional coating 10 can be seen. The functional coating 10, which can also be referred to as adhesion-promoter layer 10, has been applied over the entire brake disk 1.

For the application of the functional coating 10, the brake disk 1 was preferably heated to a temperature of 500° C. to 700° C. under a protective gas atmosphere. The brake disk 1 thus heated was dipped in a base metal molten bath. The molten bath can be an aluminum and/or zinc alloy melt.

After the dip bath, the brake disk 1, at least the brake rim 3 on which the braking surfaces are arranged, was machined to dimensions, the functional layer 10 preferably still having a thickness of 200 μm at the brake rim 3 after the machining.

The brake disk 1 was dipped completely in the hot-dip bath, such that all regions, i.e. all components 2 to 6, are also covered with the functional layer 10. In the case of the internally ventilated brake disk 1 in particular, it is the case that the two cover disks 7 and 8 are covered with the functional layer 10 not only externally but also internally. Moreover, the ribs 9 are also covered with the functional layer 10.

The brake disk 1 thus also has corrosion protection, as it were, outside the respective brake rim 3.

In a further production step, the brake disk 1, in particular the respective brake rim 3, i.e. preferably the friction surfaces, was coated by means of thermal spraying processes. In this case, hard material powders were applied by means of high-velocity flame spraying (HVOF) at least in the region of the friction surfaces having the adhesion-promoter layer 10.

In the region of its friction surfaces, the brake disk 1 thus preferably has a friction layer 11 applied by means of the preferred HVOF process and having a thickness of 30 μm to 50 μm. The hard material powders are injected with incorporated sharp-edged particles 12 into the soft adhesion-promoter layer 10 by means of the HVOF, so as to give rise to an intimate (mechanical) bond between the hard material particles and the adhesion-promoter layer 10.

The hard material particles 12 have sharp edges and have a diameter which is greater than the thickness of the friction layer 11. The particles 12 thus protrude from the surface of the friction layer 11 (FIG. 4). As can furthermore be seen in FIG. 4, some particles 12 also mesh with the "soft" adhesion-promoter layer 10, it also being the case that some particles 12 are embedded in the friction layer 11, i.e. do not protrude. The particles 12 which can be seen in FIG. 4 have a diameter which is smaller than the thickness of the friction layer 11, but nevertheless protrude from the friction layer 11.

During a braking operation, during which brake linings come into contact with the friction surface, i.e. in the present case with the friction layer 11, brake lining material is torn out of the brake lining on account of the action of the sharp-edged particles 12 and transferred onto the surface of the friction surfaces, such that a transfer film or a transfer layer is formed. This transfer film embeds the microrough surface. The transfer film remains on the surface and thus protects the brake disk 1, i.e. the adhesion-promoter layer 10, against wear. The brake lining, by contrast, is in the form of a wear part and constantly delivers new material for stabilizing the transfer film.

What is claimed:

1. A brake disk for a vehicle, in which a friction layer is arranged at least in certain regions on a base body of the brake disk, said brake disk being produced in particular by a process, wherein (a) an adhesion-promoter layer is arranged between the friction layer and the base body and is arranged on the base body so as to surround it completely, (b) particles are arranged in the friction layer and some of said particles protrude from the friction layer and some of said particles mesh with said adhesion-promoter layer and (c) after finishing, the adhesion-promoter layer has a thickness of 200 μm, the friction layer having a thickness of 30 μm to 50 μm.

2. A brake disk for a vehicle, comprising:
   a base body having a circumferential outer brake rim for contacting a brake lining;
   a friction layer arranged in at least in certain regions on the base body; and
   a functional layer arranged over an entirety of the base body wherein the functional layer has a thickness of 200 μm at the circumferential outer brake rim.

* * * * *